(12) United States Patent
Lee

(10) Patent No.: US 10,076,947 B2
(45) Date of Patent: Sep. 18, 2018

(54) DUAL DAMPER DEVICE OF VEHICLE AIR VENT

(71) Applicant: NIFCO KOREA INC., Cheonan-si, Chungcheongnam-do (KR)

(72) Inventor: Ji Hoon Lee, Cheonan-si (KR)

(73) Assignee: NIFCO KOREA INC., Cheonan-si, Chungcheongnam-Do (KR)

( * ) Notice: Subject to any disclaimer, the term of this patent is extended or adjusted under 35 U.S.C. 154(b) by 269 days.

(21) Appl. No.: 14/895,153

(22) PCT Filed: May 23, 2014

(86) PCT No.: PCT/KR2014/004597
§ 371 (c)(1),
(2) Date: Dec. 1, 2015

(87) PCT Pub. No.: WO2014/196754
PCT Pub. Date: Dec. 11, 2014

(65) Prior Publication Data
US 2016/0114654 A1    Apr. 28, 2016

(30) Foreign Application Priority Data

Jun. 5, 2013  (KR) .................. 10-2013-0064905

(51) Int. Cl.
*B60H 1/34*  (2006.01)

(52) U.S. Cl.
CPC ......... *B60H 1/3421* (2013.01); *B60H 1/3414* (2013.01); *B60H 2001/3471* (2013.01); *B60H 2001/3478* (2013.01)

(58) Field of Classification Search
CPC combination set(s) only.
See application file for complete search history.

(56) References Cited

U.S. PATENT DOCUMENTS

| 4,163,415 A * | 8/1979 | Neveux ..................... B60H 1/28 137/897 |
| 6,780,098 B2 * | 8/2004 | Nishida ................ B60H 1/3414 454/155 |

(Continued)

FOREIGN PATENT DOCUMENTS

| JP | 2000-264051 A |   | 9/2000 |
| JP | 2000264051 A | * | 9/2000 |

(Continued)

OTHER PUBLICATIONS

KR20110003480MT; machine translation of KR20110003480A, disclosed by applicant in IDS filed on Dec. 1, 2015.*

(Continued)

*Primary Examiner* — Gregory Huson
*Assistant Examiner* — Elizabeth M May
(74) *Attorney, Agent, or Firm* — Manabu Kanesaka

(57) ABSTRACT

A dual damper device of a vehicle air vent includes a duct housing having a partition wall for dividing an air path, an introduction part and a discharge part, which are bent to be inclined; a pair of dampers rotationally mounted on the air path in the introduction part; a dial knob rotationally provided to the discharge part; a dial bush having a knob fitting part and an elongated guide groove; a pair of damper bushes vertically coupled to the dampers; and a bush link. The duct housing further includes a dial support member rotationally coupled to the dial knob and damper holding stepped protrusions provided to the partition wall and the introduction part.

6 Claims, 7 Drawing Sheets

(56) References Cited

U.S. PATENT DOCUMENTS

| | | | |
|---|---|---|---|
| 6,881,139 | B2 | 4/2005 | Yang |
| 7,575,510 | B2 * | 8/2009 | Kim ..................... B60H 1/3428 454/155 |
| 2005/0048905 | A1 | 3/2005 | Yang |

FOREIGN PATENT DOCUMENTS

| | | |
|---|---|---|
| JP | 2001-063354 A | 3/2001 |
| JP | 2009-143422 A | 7/2009 |
| KR | 10-2005-0017879 A | 2/2005 |
| KR | 10-2009-0007164 A | 1/2009 |
| KR | 20-2011-0003480 U | 4/2011 |
| KR | 20-2011-0003729 U | 4/2011 |
| KR | 20-2011-0004724 U | 5/2011 |
| KR | 20-0462226 Y1 | 9/2012 |

OTHER PUBLICATIONS

China Patent Office, "Office Action for Chinese Patent Application No. 201480031420.4," dated Nov. 4, 2016.
PCT, "International Search Report for International Application No. PCT/KR2014/004597".
Europe Patent Office, "Search Report for European Patent Application No. 14807036.0," dated Feb. 28, 2017.

* cited by examiner

DUAL DAMPER DEVICE OF VEHICLE AIR VENT

TECHNICAL FIELD

The present invention relates to a dual damper device of a vehicle air vent, wherein a pair of dampers which opens or closes the air path of an air vent housing with a single dial knob is provided to a duct housing having an introduction part and a discharge part bent to be inclined.

BACKGROUND ART

In general, a vehicle air vent includes an air vent housing provided with an air path, a damper for opening and closing the air path of the air vent housing, and a knob for operating the damper.

As for the knobs which operate the damper in the vehicle air vent, slide type knobs and dial type knobs are mainly used, wherein an operation member is necessary for the connection of such a dial type knob and the damper.

Referring to FIG. 1 which shows a prior art air vent using such a dial type knob, Korean Patent Publication No. 10-0736981 discloses a technique for rotating a damper door, wherein a knob 6 is mounted on the outside of a duct 5 and coupled to one end of a damper rod 8, and a damper link 7 is connected to the other end of the damper rod 8 so as to rotate a damper door (not shown) which is rotationally provided to the inside of the duct 5 such that the damper door can rotate by the rotation force of the knob 5.

Meanwhile, the above vehicle air vent has a disadvantage that the air path is difficult to be opened or closed by a single damper in the case that the width of the air path of the air vent housing is wide. Therefore, a partition wall is provided in the center of the inside of the air vent housing and the air path is opened or closed by a pair of dampers which simultaneously operates as dial knobs.

However, the prior art as above still has problems, wherein the dial knobs and the pair of dampers are connected using a plurality of link members in the air vent such that a large number of parts are required causing the manufacture thereof complicated and the dampers cannot smoothly carry out simultaneous operations.

PRIOR ART DOCUMENT

Patent Document

Patent Document 1: Korean Patent Publication No. 10-0736981, Air vent damper using 4-joint link, registered on 2 Jul. 2007

SUMMARY OF THE INVENTION

Technical Problem

The present invention has been made so as to resolve the above-described problems, and its objective is to provide a dual damper device of a vehicle air vent, wherein a pair of dampers which opens or closes the air path of an air vent housing is provided to a duct housing in which an introduction part and a discharge part are bent to be inclined.

Another objective of the present invention is to provide a dual damper device of a vehicle air vent, wherein the rotational motion of a dial knob is converted into the rectilinear motion of a bush link and a pair of dampers rotates by the movement of the bush link such that the installation and operation thereof can be simply carried out without any limitation of the shape of the duct housing which is formed to be inclined.

Solution to Problem

In order to achieve the above and any other objectives of the present invention, a dual damper device of a vehicle air vent comprises:

a duct housing 10 which is provided with a partition wall 14 for dividing an inner air path 13 into halves and in which an introduction part 11 at one end and a discharge part 12 at the other end are formed to be bent with an inclination;

a pair of dampers 20 which is rotationally provided to the air path 13 in the introduction part 11 so as to open or close the air path 13;

a dial knob 30 which is rotationally mounted on the outer surface of the discharge part 12 of the duct housing 10 and has an operation surface 32 formed on the front surface thereof and an insertion hole 33 formed in the rear surface thereof;

a dial bush 40 which has a knob fitting part 41 formed on the upper portion thereof so as to be vertically coupled to the insertion hole 33 of the dial knob 30 and an elongated guide groove 42 formed on the inside thereof;

a pair of damper bushes 50, each having one end vertically coupled to the one pair of dampers 20 and the other end formed with a link fitting hole 52; and a bush link 60 which has a guide pin 61 protruding from the upper portion thereof so as to be fitted into the guide groove 42 of the dial bush 40 and bush fitting parts 62 formed at both sides of the rear surface thereof so as to be coupled to the link fitting holes 52 of the one pair of damper bushes 50.

In addition, the duct housing 10 further includes a dial support member 70 such that the dial knob 30 is rotationally coupled to the dial support member 70 and then fixed to the outer surface of the discharge part 12, and the duct housing 10 is provided with damper holding stepped protrusions 15 at the upper and lower portions of the both side surfaces in the center of the partition wall 14 which divides the inner air path 13 into halves and on the both side surfaces in the introduction part 11.

Advantageous Effects of Invention

A dual damper device of a vehicle air vent according to the present invention in the above configuration can be used in a structure in which a duct housing is largely bent and stably operate a pair of dampers by simply rotating a single knob, thereby promoting the convenience of users.

Further, a pair of dampers can be opened or closed using a single dial knob. Therefore, the manufacture can be made with a small number of parts, thereby contributing to the decrease of the weight and manufacture costs.

BEST MODE FOR CARRYING OUT THE INVENTION

Hereinafter, embodiments of the present invention will now be described with respect to the configuration in detail with reference to the drawings.

In a dual damper device of a vehicle air vent according to the present invention, a pair of dampers which opens or closes the air path of an air vent housing through a single dial knob is provided to a duct housing in which an introduction part and a discharge part are bent to be inclined.

Figure 1:
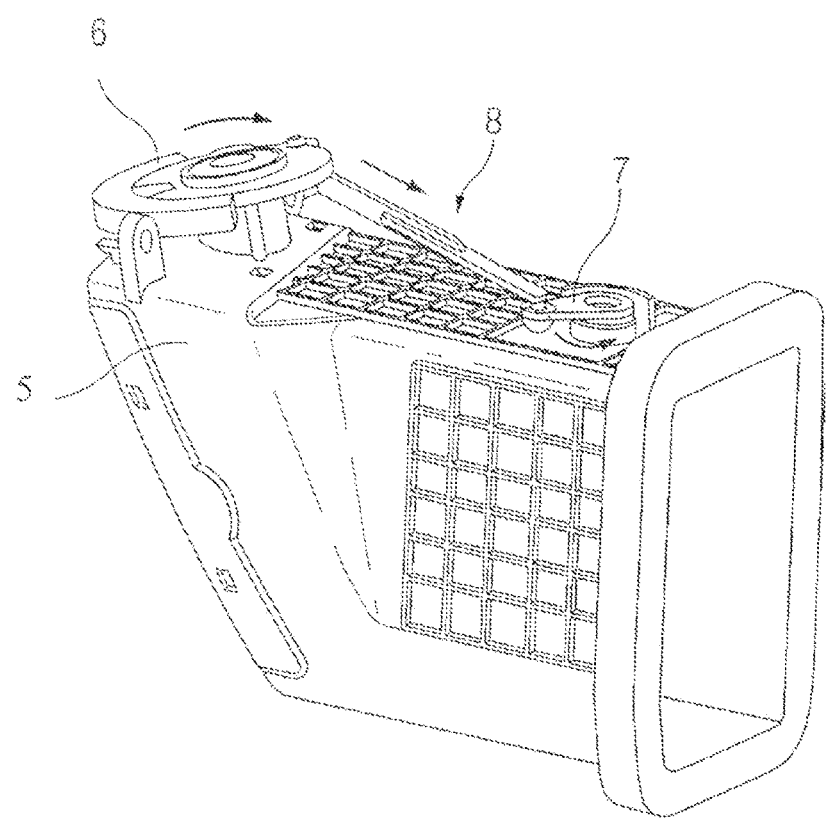
FIG. 1 is a perspective view showing the structure of a prior art air vent.
Figure 2:
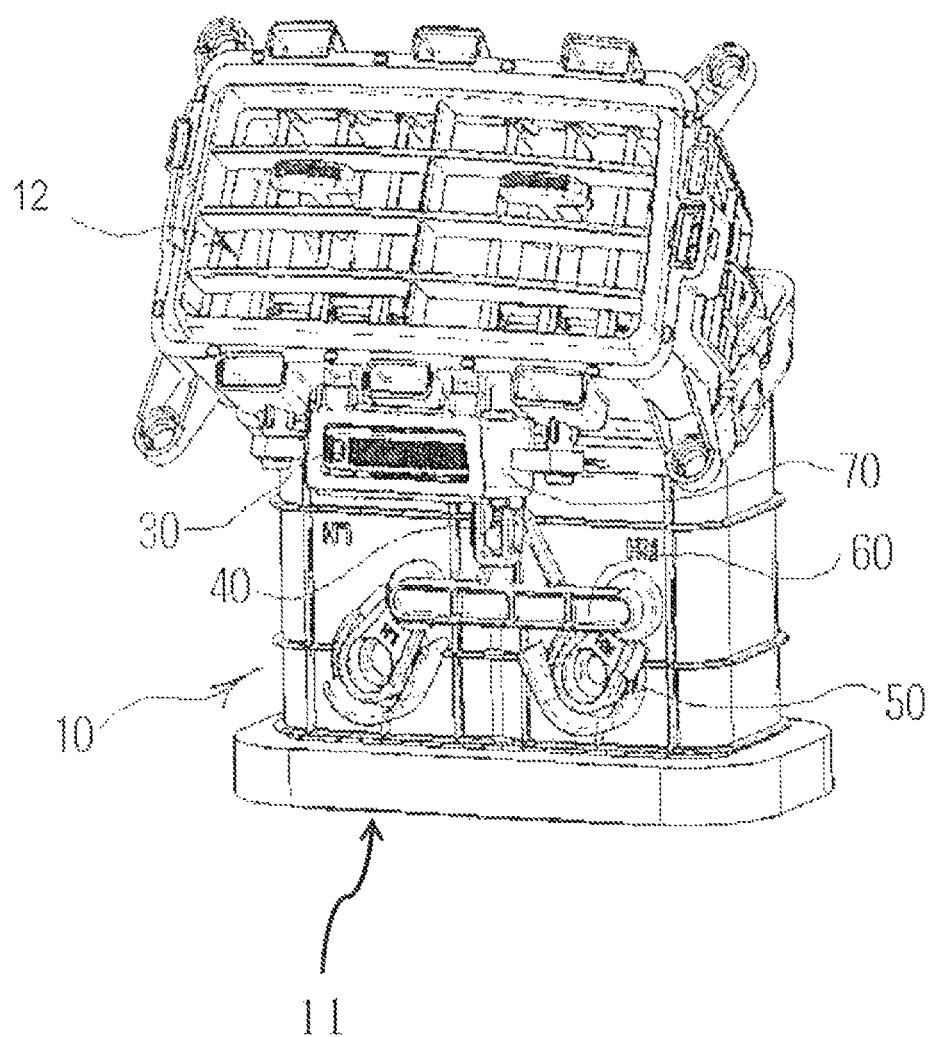
FIG. 2 is a bottom perspective view showing a preferred embodiment of the present invention.
Figure 3:
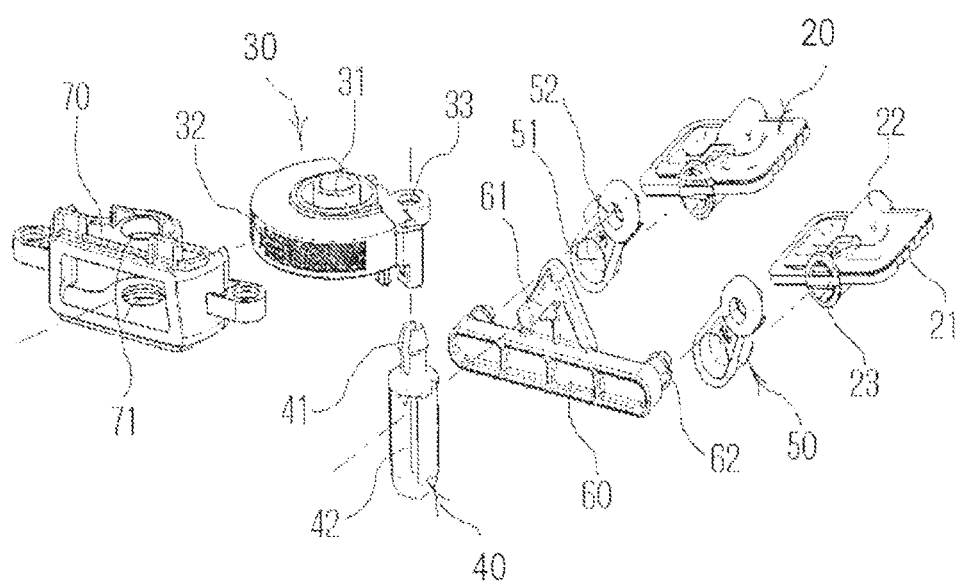
FIG. 3 is an exploded perspective view showing the structure of the present invention.
Figure 4:
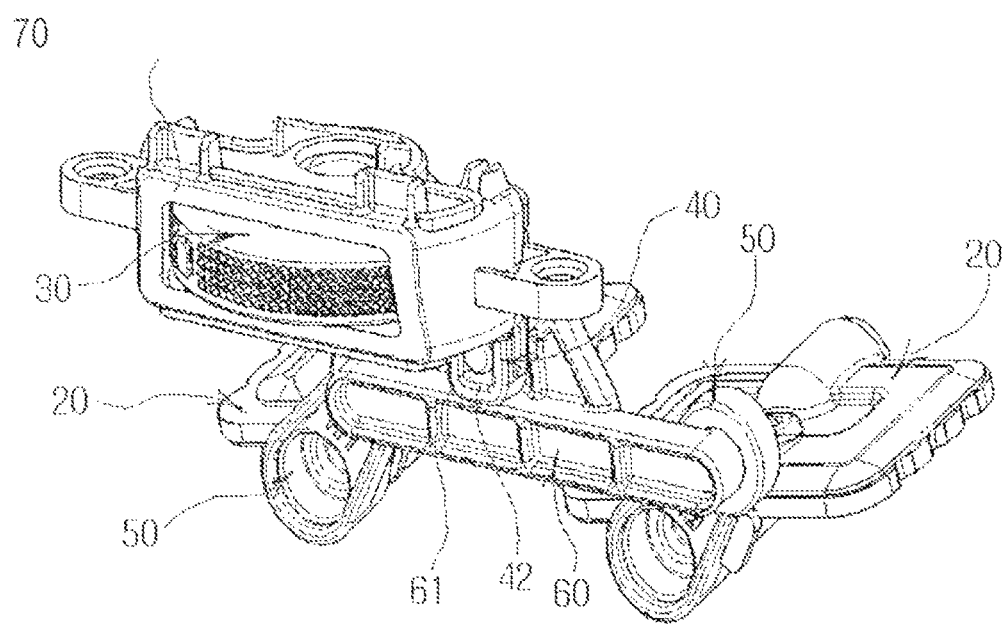
FIG. 4 is a perspective view showing the structure of the present invention in an assembled state.

First of all, explaining the present invention with reference to FIG. 2 to FIG. 4, the present invention relates to an air vent for blowing wind to rear seats, wherein a duct housing 10 is formed to be bent according to the positional characteristics of the air vent which are provided at the rear side of a center fascia console box.

The duct housing 10 includes a partition wall 14 which divides an inner air path 13 into halves, an introduction part 11 which is provided at one end of a vertically formed lower portion so as to introduce air, and a discharge part 12 which is formed to be bent at the other end so as to discharge the introduced air.

At this time, a pair of dampers 20 is rotationally provided to the air path 13 which is in the introduction part 11 of the duct housing 10 so as to open or close the air path 13.

That is, the dampers 20 are horizontally provided to the introduction part side of the duct housing 10, wherein the dampers 20 are provided with sealing plates 21 which are positioned at the air path 13, rotation shafts 22 which are provided in the center of the sealing plates 21 so as to be coupled to the hinge coupling holes of the duct housing 10, and damper bush coupling parts 23 which are provided in the center of the front portions thereof.

A pair of damper bushes 50 is vertically coupled to the pair of dampers 20, wherein each of the pair of damper bushes 50 has an elastic connection piece 51 provided at one end of the lower portion thereof and a link fitting hole 52 formed at one end of the upper portion thereof.

Therefore, the elastic connection pieces 51 are fitted into the damper bush coupling parts 23 of the dampers 20 such that the damper bushes 50 are vertically coupled to the dampers 20 and the dampers 20 which are coupled at the lower portion rotate in response to the upper movement of the damper bushes 50.

In addition, a dial knob 30 is rotationally mounted on the outer surface of the discharge part 12 of the duct housing 10 and includes a fixing shaft 31 which is inserted and fixed into the hinge coupling holes 71 of a dial support member 70 formed in the center between the upper and lower surfaces thereof, an operation surface 32 which is formed on the front surface of the outer periphery thereof so as to be exposed to the front portion of the duct housing 10, and an insertion hole 33 which is formed in the rear surface of the outer periphery so as to be coupled to a dial bush 40.

The dial bush 40 is formed in the shape of a rod and has a knob fitting part 41 which is formed at the upper portion thereof so as to be vertically coupled to the insertion hole 33 of the dial knob 30 and an elongated guide groove 42 which is formed on the inside thereof.

A bush link 60 is provided to connect the dial bush 40 which is vertically coupled to the dial knob 30 and the damper bushes 50 which are vertically coupled to the dampers 20 to each other.

The bush link 60 includes a guide pin 61 which is formed to horizontally protrude from the upper portion thereof so as to be fitted into the guide groove 42 of the dial bush 40 and bush fitting parts 62 which are formed to horizontally protrude from the both sides of the rear surface thereof so as to be coupled to the link fitting holes 52 of the pair of damper bushes 50.

At this time, the bush link 60 has the guide pin 61 which is formed as an elongated shaft at a position not to interfere in the dial bush 40 so as to be inserted and fixed into the guide groove 42 of the dial bush 40.

Therefore, the bush link 60 is assembled in the state that the guide pin 61 of the bush link 60 is inserted into the guide groove 42 of the dial bush 40. Therefore, as the dial knob 30 rotates with respect to the fixing shaft 31 in the horizontal direction, the dial bush 40 which is coupled to the rear surface pushes the guide pin 61 which is assembled into the guide groove 42 in the horizontal direction while moving by the rotation distance such that the bush link 60 moves in the horizontal direction.

Further, the lower portions of the damper bushes 50 which are coupled to the rear surface of the bush link 60 move in the horizontal direction according to the horizontal movement of the bush link 60, thereby rotating the dampers 20 which are assembled into the duct housing 10.

That is, as the damper bushes 50 are in the state that the elastic connection pieces 51 at the lower portions are fixed and coupled to the damper bush coupling parts 23 of the dampers 20 which are rotationally assembled into the inner air path 13 of the duct housing 10, the lower portions rotate in position by the horizontal movement of the upper portions which are coupled to the bush link 60 such that the dampers 20 can open or close the air path 13.

Now, the embodiments of the present invention in the above structure will be described in more detail with reference to attached FIG. 5a to FIG. 5c as follows.

Figure 5A:
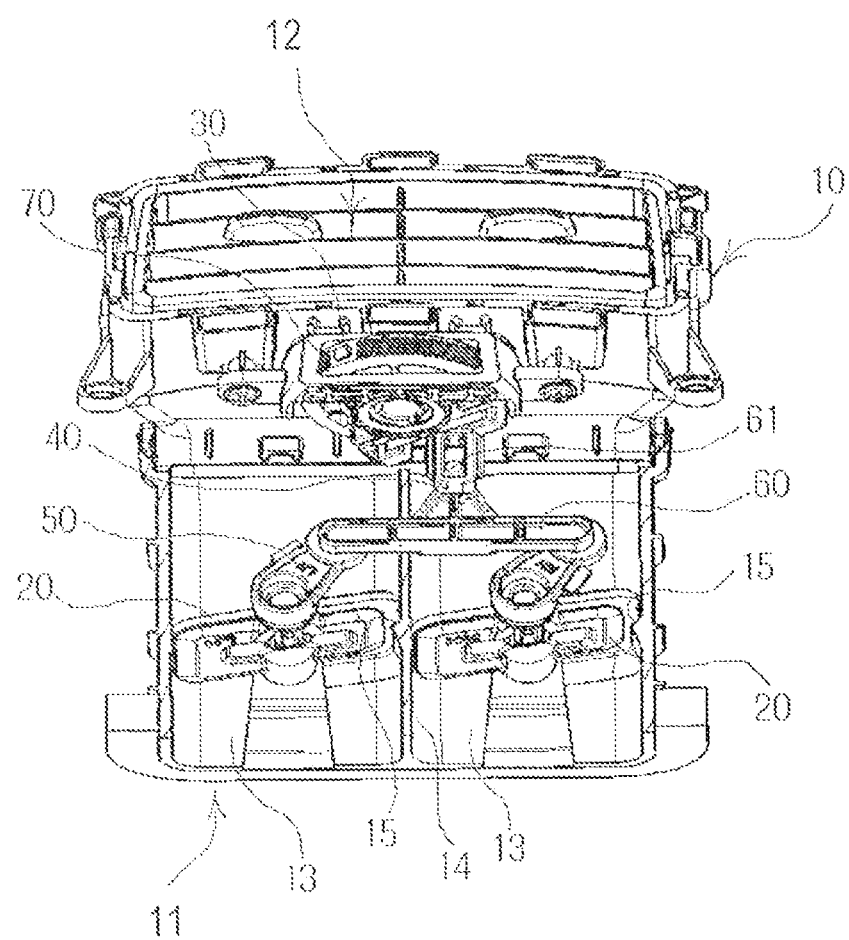
FIG. 5a to FIG. 5c are bottom views showing the operational embodiments of the present invention.

First of all, referring to FIG. 5a, the air path 13 of the duct housing 10 is closed by the dampers 20 in an approximately horizontal state and the dial knob 30 rotates in the left direction such that the dial bush 40 and the bush link 60 which are connected and assembled into the rear portion are positioned through the movement in the right direction.

Herein, the duct housing 10 is provided with damper holding stepped protrusions 15 at the upper and lower portions of the both side surfaces in the center of the partition wall 14 which divides the inner air path 13 into halves, and on the both side surfaces in the introduction part 11, the dampers 20 are held by the holding stepped protrusions 15 so as to prevent the excessive rotation of the dampers 20, thereby preventing the damage to the product and the malfunction thereof.

If the dial knob 30 rotates in the clockwise direction in the above state, the dial bush 40 which is coupled to the rear portion of the dial knob 30 moves in the left direction and the bush link 60 which is assembled into the dial bush 40 also moves together with the dial bush 40 in the left direction such that each of the dampers 20 which is rotationally provided to the duct housing 10 rotates in the counterclockwise direction, thereby opening the air path 13.

Figure 5B:
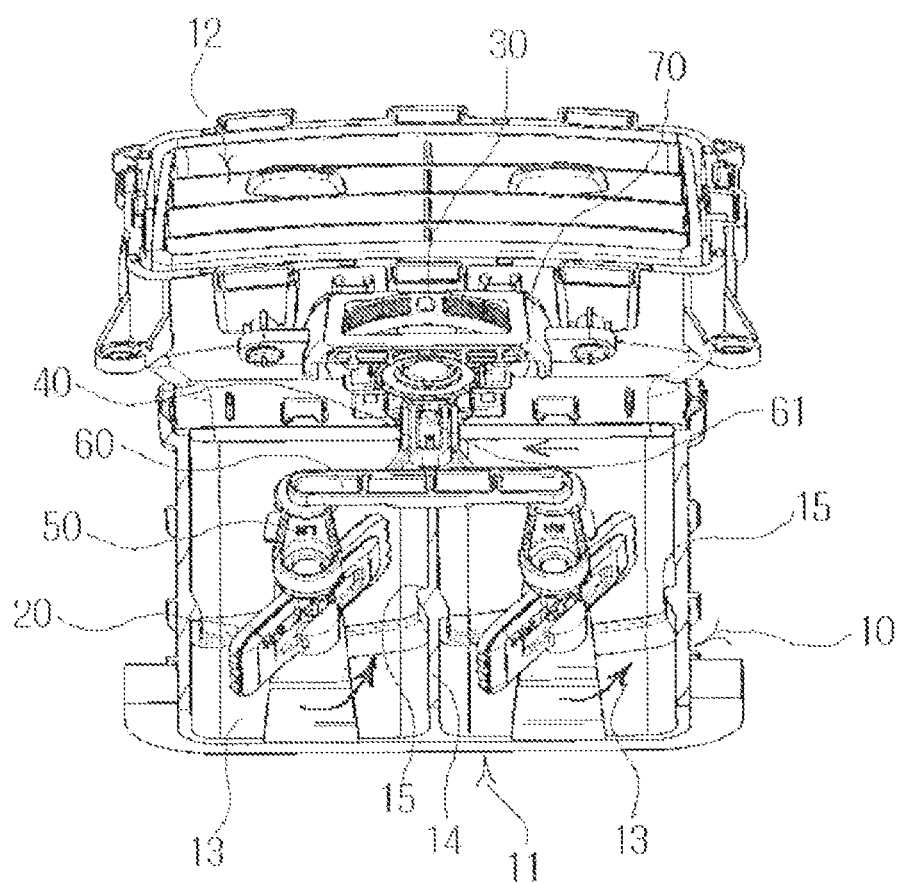
Figure 5C:
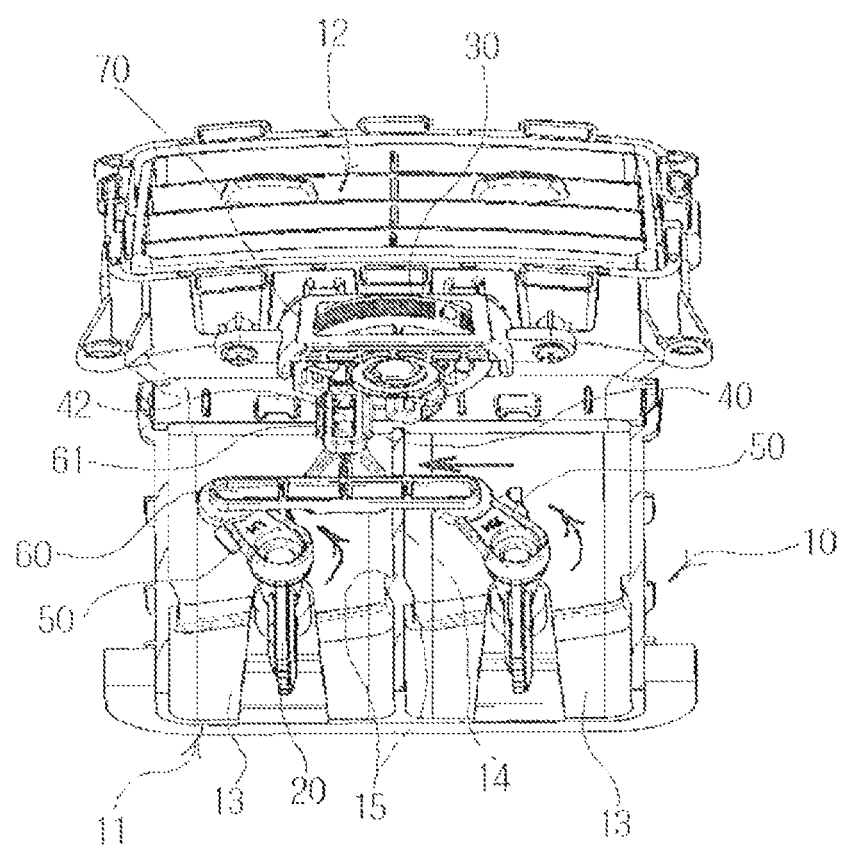

That is, each of the dampers 20 rotates at the angle of 40 degrees when the dial knob 30 rotates at the angle of 35 degrees as shown in FIG. 5b, while each of the dampers 20 rotates at the angle of 80 degrees when the dial knob 30 rotates at the angle of 70 degrees, as shown in FIG. 5c, thereby completely opening the air path 13.

In the dual damper device of the vehicle air vent according to the present invention, the movement distances of the dial bush 40 and the bush link 60 as well as the rotation angle of each of the dampers 20 are controlled according to the rotation angle of the dial knob 30 such that the discharge amount of the air path 13 can be set.

Meanwhile, in the state that the air path 13 of the duct housing 10 is completely opened in the vertical state of the both dampers 20 as shown in FIG. 5c, the dial knob 30 rotates in the right direction and the dial bush 40 and the bush link 60 assembled into the rear portion are positioned in the left direction.

Explaining the above operational relations in more detail, if the dial knob 30 which is mounted using the dial support member 70 on the outer surface of the discharge part of the duct housing 10 rotates in the right direction, then the dial bush 40 which is coupled to the rear portion moves in the left direction, and the bush link 60 in which the guide pin 61 is fitted into the guide groove 42 of the dial bush 40 simultaneously moves in the left direction according to the movement of the dial bush 40.

At this time, the dial bush 40 rotationally moves together with the dial knob 30. However, the guide groove 42 of the dial bush 40 is formed in the shape of an elongated hole on a vertical line and the guide pin 61 of the bush link 60 is formed as an elongated shaft at the position not to interfere with the dial bush 40 so as to be inserted and coupled into the guide groove 42 of the dial bush 40. Therefore, the bush link 60 can be smoothly positioned with respect to the rotational movement of the dial bush 40.

That is, the dial bush 40 is positioned at one of both sides and the guide pin 61 of the bush link 60 is positioned at the lowermost end of the guide groove 42 in the state that the left or right rotation of the dial knob 30 is completed as shown in FIG. 5a and FIG. 5c, while the dial bush 40 is positioned at the rearmost side in the center and the guide pin 61 is positioned at the uppermost end of the guide groove 42 in the state as shown in FIG. 5b.

Therefore, the bush link 60 moves in association with the movement of the dial bush 40 and the damper bushes 50 which are respectively coupled to the bush link 60 rotate such that the dampers 20 which are provided to the air path 13 rotate.

As described hereinabove, the dual damper device of a vehicle air vent according to the present invention can be used in the duct housing 10 in which the introduction part 11 and the discharge part 12 are formed to be bent with an inclination, and the horizontal rotation of the dial knob 30 is converted in direction through the dial bush 40, the bush link 60 and the damper bushes 50 such that the pair of dampers 20 can rotate in the horizontal direction so as to stably open or close the air path 13 of the duct housing 10.

The embodiments described above are to be understood as a few illustrative examples of the present invention. It will be understood by those skilled in the art that various modifications, combinations and changes may be made to the embodiments without departing from the scope of the present invention.

BRIEF EXPLANATION OF REFERENCE SYMBOLS

10—duct housing,
11—introduction part
12—discharge part,
13—air path
20—damper,
30—dial knob
33—insertion hole,
40—dial bush
41—knob fitting part,
42—guide groove
50—damper bush,
51—elastic connection piece
52—link fitting hole,
60—bush link
61—guide pin,
62—bush fitting part
70—dial support part

What is claimed is:

1. A dual damper device of a vehicle air vent, comprising:
a duct housing having an inner air path, and a partition wall for dividing the inner air path into halves;
a pair of dampers rotationally mounted on rotation axes thereof in the inner air path so as to open or close the inner air path;
a dial knob rotationally mounted on an outer surface of the duct housing and having an operation surface formed on one portion thereof, and an insertion hole formed at another portion thereof;
a dial bush arranged in a direction substantially perpendicular to the rotation axes of the pair of dampers and having a knob fitting part protruding outwardly from one end portion thereof and rotationally coupled to the insertion hole of the dial knob, and an elongated guide groove formed inside the dial bush along a longitudinal direction thereof;
a pair of damper bushes arranged substantially perpendicular to the rotational axes of the pair of dampers, each having one end coupled to one of the pair of dampers and another end formed with a link fitting hole; and
a bush link having a guide pin protruding outwardly from one portion thereof in the direction substantially parallel to the rotation axes of the pair of dampers so as to be slidably fitted into the guide groove of the dial bush, and bush fitting parts formed at two sides thereof so as to be rotationally coupled to the link fitting holes of the pair of damper bushes,
wherein when the dial knob rotates on a rotation axis thereof, the dial bush moves around the rotational axis of the dial knob to thereby move the bush link in a direction substantially perpendicular to the rotation axes of the pair of dampers while the guide pin of the bush link slides in the guide groove of the dial bush, and in linkage with movement of the bush link, the pair of dampers rotates on the rotation axes thereof,
the bush fitting parts, the guide pin, and the rotation axes of the pair of dampers extend substantially parallel to each other, and the rotational axis of the dial knob extends in a direction substantially perpendicular to the guide pin.

2. The dual damper device of a vehicle air vent according to claim 1, wherein the duct housing further includes an introduction part at one end, and a discharge part at another end to be bent relative to each other with an inclination.

3. The dual damper device of a vehicle air vent according to claim 2, wherein the duct housing further includes a dial support member in which the dial knob is rotationally coupled so as to be fixed to an outer surface of the discharge part.

4. The dual damper device of a vehicle air vent according to claim 2, wherein the duct housing extends in a direction substantially parallel to the rotation axis of each of the pair of damper bushes, and the duct housing includes damper holding stepped protrusions on two side surfaces of the partition wall and two inner sides of the introduction part at upper and lower portions of the duct housing relative to an extending direction of the duct housing.

5. The damper device of a vehicle air vent according to claim 1, wherein the knob fitting part is rotationally fitted into the insertion hole, each of the bush fitting parts is rotationally fitted into the link fitting hole, and the guide pin is movably disposed into the guide groove.

6. The damper device of a vehicle air vent according to claim 1, wherein the guide pin of the bush link protrudes from one surface of the bush link in a direction opposite to the bush fitting parts, and each of the pair of dampers includes a damper bush coupling part arranged at a side of the damper, and each of the pair of damper bushes includes an elastic connection piece formed at the one end thereof to be coupled to the damper bush coupling part, and the link fitting hole formed at the another end thereof to be coupled to each of the bush fitting parts.

\* \* \* \* \*